Jan. 12, 1960

G. N. KROUSE ET AL 2,921,282

STRAIN GAGE EXTENSOMETER

Filed Dec. 3, 1958

INVENTORS.
Glen N. Krouse
Bruce L. Sutton
BY Wm. R. Glisson
ATTORNEY

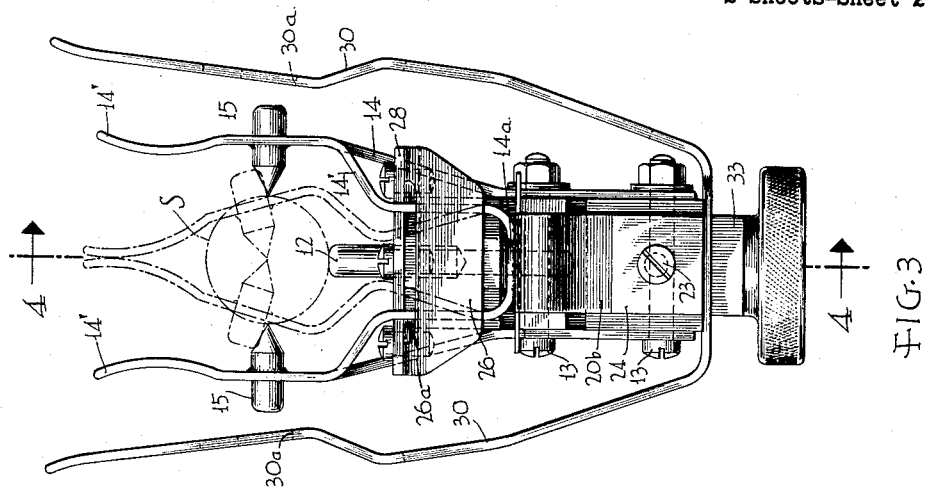
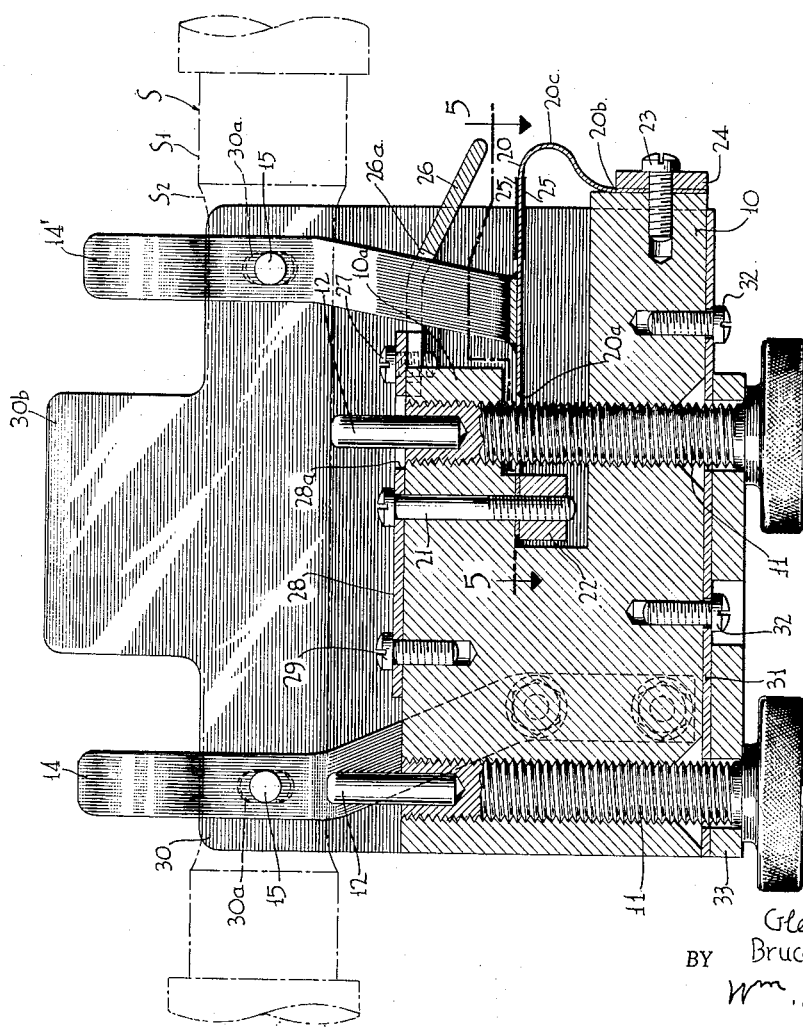

United States Patent Office 2,921,282
Patented Jan. 12, 1960

2,921,282

STRAIN GAGE EXTENSOMETER

Glen N. Krouse, Pottstown, and Bruce L. Sutton, Darling, Pa., assignors, by mesne assignments, to The Budd Company, Philadelphia, Pa., a corporation of Pennsylvania Application December 3, 1938, Serial No. 777,996

3 Claims. (Cl. 338—6)

This invention relates to an extensometer for measuring deformations of test specimens and has for an object the provision of improvements in this art.

One of the particular objects is to provide an extensometer which utilizes a resistance strain gage in an arrangement to provide very accurate measurements.

Another object is to provide an extensometer which can be very easily, quickly and securely applied to a test specimen.

Another object is to provide means for setting and holding the device in accurate position for specimens of different diameters.

Another object is to provide protecting guard and gage means for the specimen engaging and gaging means, the guard means being arranged to accurately position and provide access to the specimen engaging elements to drive them into the specimen without removing the guard means from the extensometer.

The above and other objects and advantages of the invention will be apparent from the following description of an exemplary embodiment, reference being made to the accompanying drawings, wherein:

Fig. 3 is an end elevation, looking at the right hand end of Figs. 1 and 2;

Fig. 4 is a longitudinal section taken on the line 4—4 of Fig. 3; and

Figure 1:
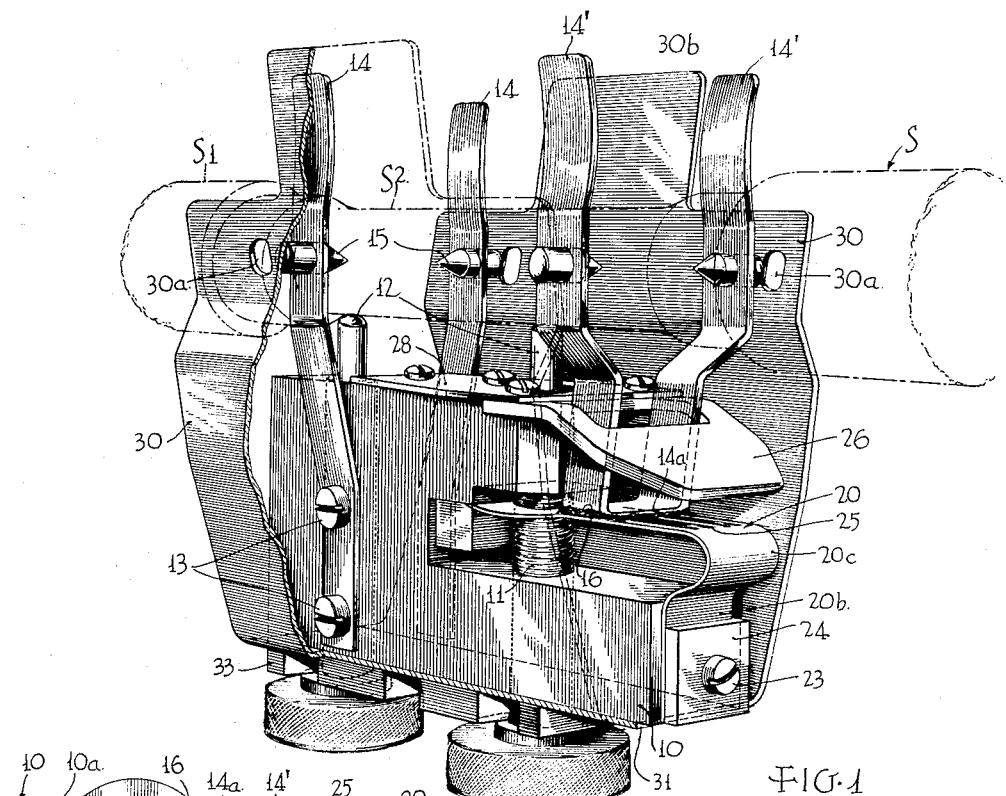
Fig. 1 is a side perspective view of the extensometer applied to a specimen, part of the guard being cut away to show parts therebelow.

As shown in the drawings the specimen S has enlarged ends S1 adapted to be gripped in a testing machine and a reduced portion S2 where the change in length is to be measured. The specimen is indicated only in phantom in the drawings.

The extensometer comprises a base 10 having threaded holes to receive gage screws 11 adapted to be adjusted to line up the base with the specimen and to adjust for the diameter of the specimen, the screws having rounded ends 12 for engaging the side of the specimen.

Near one end of the block there are secured to it, as by screws 13, two opposed specimen-clamping gage pin springs 14 carrying opposed pointed drive gage pins 15 adapted to engage the sides of the specimen.

Near the other end of the block there are provided other specimen clamping gage pin springs 14' carrying opposed drive gage pins 15. The springs 14' are connected at the inner end by a flat wide base element 14a which is firmly secured, as by solder 16 to a load spring 20.

The base 10 is recessed at the end on the inner side to receive the load spring 20 and at one end the spring is firmly secured to an overhanging portion 10a of the base by a screw 21 threaded into a clamping block 22. The gage screw 11 is threaded through the overhanging portion and passes through a large clearance hole 20a in the load spring 20.

The load spring is adapted to be bent by the action of the U-shaped clamping gage pin spring unit, comprising the springs 14' and their connecting base element 14a, and to assist in its proper bending action it is provided with a lateral end portion 20b disposed at right angles to the main portion carrying the gage springs. The end portion 20b is firmly secured to the end of the base 10, as by a screw 23 and clamp plate 24. This end portion 20b joins the main portion, or spring proper, in an S-shaped curved resilient portion 20c located on the end.

Figure 5:
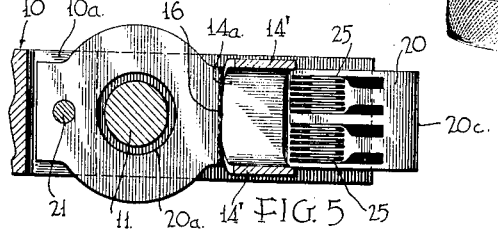
Fig. 5 is an interior view in plan and section of a detail, the view being taken on the line 5—5 of Fig. 4.
Figure 2:
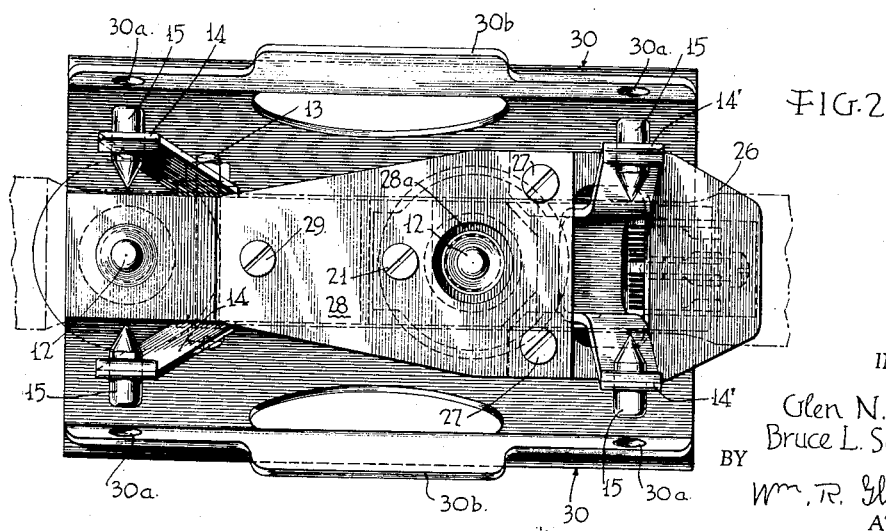
Fig. 2 is a top plan view.

Between the spring base 14a and the end of the spring 20 where it joins the end curved portion 20c there are mounted a plurality of resistance type strain gages 25 which are connected into a bridge circuit (by leads, not shown) to indicate the load by the amount of bending in the spring. The gages are cemented to and insulated from the spring in known manner. In Fig. 5 two foil-type strain gages are shown and there will be two others on the opposite side of the spring, as indicated in Fig. 4.

The gages are protected by a bent overhanging guard plate 26 which is adjustably secured, as by screws 27 to a support plate 28 carried by the base. Screw 21 and another screw 29 are shown for securing the support plate to the base. A large opening 26a is provided in the guard plate 26 to clear the springs 14'. A large hole 28a is provided in the support plate 28 to clear the gage screw 11.

Guard and gage plates 30 are provided on each side of the extensometer, these plates being connected at the inner end by a base plate 31 which is secured to the main base 10, as by screws 32. The U-shaped guard plate unit is springy to cause the plates to normally stand clear of the clamp springs 14, 14' and the drive gage pins 15 but is provided with close fitting clearance holes 30a at the gage pins and with finger tab extensions 30b so that they may be bent in to expose the outer ends of the pins 15 and permit them to be tapped with a hammer to seat them in the sides of the test specimen. The close fit of the holes 30a is at the sides in a longitudinal direction so as to accurately locate the gage pins before they are driven in the specimen. The pins 15 are tapered on their ends to drift slightly as urged by the gage holes 30a in the plates 30. The holes are elongated at right angles to clear the pins in different positions which they may assume in the bending of their springs 14, 14'.

A shim 33 of selected thickness for the diameter of the specimen to be tested is placed below the lower surface of the knobs of the screws 11 to stop them with their ends in the proper position. The shims are slotted from one side to slip in upon the shanks of the screws 11 and past the head of screw 32.

In use, the shim 33 is selected for the specimen to be tested and the screws 11 turned in to position the ends properly. The clamp springs 14, 14' are pushed on the specimen or held apart to prevent marring it until the ends 12 of the screws 11 engage the side of the specimen. Then the gage plates are squeezed in to properly locate the pins 15. They are held in while the pins 15 are tapped in to engage them in the specimen. The spring of the members 14, 14' holds the device on the specimen. The plates 30 are now released. The gages 25 being properly located, the specimen is now subjected to test. The shape and arrangement of the spring beam 20 and the arrangement of the gages 25 thereon are such as to give very accurate results. It will be noted that the device has a normal center zero position and can be used for both tensile and compression test work. By suitable application it can be used to measure many types of deformations.

What is claimed is:

1. An extensometer comprising in combination, a base, longitudinally spaced pairs of opposed specimen clamping springs carried by said base, a load spring secured at its ends to said base and supporting one pair of said clamping springs, and resistance strain gages mounted on said load spring, the load spring having one generally straight side portion disposed parallel to the specimen, a laterally bent end portion extending radially of the specimen, and a reversely curved end portion joining the side and end portions, the clamping springs being mounted on said side portion of the load spring at a distance from the end and the strain gages being mounted on the side portion between the clamping springs and the end having the lateral and curved portions.

2. An extensometer comprising in combination, a base, longitudinally spaced pairs of opposed specimen clamping springs carried by said base, drive gage pins carried by said clamping springs, said pins having side tapered outer ends, a strain deformable member provided with strain responsive means mounted on said base and operated by the change in distance between said pins carried by said clamping springs, and gage and guard plates carried by said base having holes which fit said pins closely on the longitudinal sides to accurately position them when the plates are pressed in, the holes also exposing the outer ends of said pins when the plates are pressed in to permit them to be driven into the sides of a specimen.

3. An extensometer as set forth in claim 2, which also includes radially adjustable means for engaging the side of a specimen to accurately position the gage pins on the sides of a specimen.

References Cited in the file of this patent

UNITED STATES PATENTS

| | | |
|---|---|---|
| 910,509 | Darwin | Jan. 26, 1909 |
| 2,423,867 | Zener | July 15, 1947 |
| 2,663,085 | Ruge | Dec. 22, 1953 |